(12) United States Patent
Quesnel

(10) Patent No.: US 8,249,412 B2
(45) Date of Patent: Aug. 21, 2012

(54) WEDGE DEADEND TO SUPPORT OPTICAL GROUND WIRE

(75) Inventor: Wayne L. Quesnel, Spartanburg, SC (US)

(73) Assignee: AFL Telecommunications LLC, Spartanburg, SC (US)

( * ) Notice: Subject to any disclaimer, the term of this patent is extended or adjusted under 35 U.S.C. 154(b) by 401 days.

(21) Appl. No.: 12/531,798

(22) PCT Filed: Apr. 7, 2009

(86) PCT No.: PCT/US2009/039763
§ 371 (c)(1),
(2), (4) Date: Sep. 17, 2009

(87) PCT Pub. No.: WO2009/126620
PCT Pub. Date: Oct. 15, 2009

(65) Prior Publication Data
US 2011/0268417 A1   Nov. 3, 2011

Related U.S. Application Data

(60) Provisional application No. 61/043,185, filed on Apr. 8, 2008.

(51) Int. Cl.
*G02B 6/00* (2006.01)
(52) U.S. Cl. .................................. 385/137; 104/220
(58) Field of Classification Search .................. 385/137; 104/220
See application file for complete search history.

(56) References Cited

U.S. PATENT DOCUMENTS

| | | | | |
|---|---|---|---|---|
| 1,710,697 A * | 4/1929 | Gilbert | | 114/199 |
| 2,431,819 A * | 12/1947 | Meyer | | 24/132 R |
| 2,486,397 A * | 11/1949 | Feilbach | | 244/110 G |
| 2,540,887 A * | 2/1951 | Hyatt | | 24/68 R |
| 2,853,039 A * | 9/1958 | Fuerst | | 114/210 |
| 2,880,634 A * | 4/1959 | Betz | | 81/9.3 |
| 2,942,315 A * | 6/1960 | Johnson | | 24/134 R |
| 3,046,929 A * | 7/1962 | Piver | | 114/218 |
| 3,189,377 A * | 6/1965 | Gardner | | 294/101 |
| 3,354,518 A * | 11/1967 | Eugene | | 24/134 R |
| 3,435,782 A * | 4/1969 | Stewart | | 104/220 |
| 3,730,129 A * | 5/1973 | Helms | | 114/218 |
| 4,066,368 A * | 1/1978 | Mastalski et al. | | 403/211 |
| 4,368,769 A * | 1/1983 | Rookasin | | 152/218 |
| 4,465,011 A * | 8/1984 | Merry | | 114/199 |
| 4,531,610 A * | 7/1985 | Fertier et al. | | 182/5 |
| 4,541,149 A * | 9/1985 | Jensen | | 24/134 R |

(Continued)

FOREIGN PATENT DOCUMENTS

DE    3123591 A1 * 12/1982
(Continued)

OTHER PUBLICATIONS

International Search Report of PCT/US2009/039763 dated May 14, 2009.

*Primary Examiner* — Charlie Peng
*Assistant Examiner* — Peter Radkowski
(74) *Attorney, Agent, or Firm* — Sughrue Mion, PLLC

(57) ABSTRACT

A wedge deadend used to secure a cable is disclosed. The wedge deadend includes a single assembled frame comprising two plates. Two wedges between the plates grip a cable between them. A cam/bail retainer is included to align the wedges precisely.

21 Claims, 12 Drawing Sheets

U.S. PATENT DOCUMENTS

| | | | |
|---|---|---|---|
| 4,620,499 A * | 11/1986 | Slemmons | 114/218 |
| 4,795,856 A * | 1/1989 | Farmer | 174/40 R |
| 4,801,127 A * | 1/1989 | Patterson, Jr. | 254/134.3 FT |
| 4,820,901 A * | 4/1989 | Peviani | 219/138 |
| 4,912,817 A * | 4/1990 | Sandreid | 24/132 R |
| 4,993,123 A * | 2/1991 | Siwek | 24/136 R |
| 5,054,577 A * | 10/1991 | Petzl et al. | 182/5 |
| 5,339,498 A * | 8/1994 | Parsons | 24/129 R |
| 5,360,083 A * | 11/1994 | Hede | 182/5 |
| 5,421,073 A * | 6/1995 | Johnson et al. | 29/228 |
| 5,467,726 A * | 11/1995 | Hutchins | 114/218 |
| 5,511,909 A * | 4/1996 | Calandra et al. | 405/259.6 |
| 5,577,576 A * | 11/1996 | Petzl et al. | 188/65.4 |
| 5,619,610 A * | 4/1997 | King et al. | 385/139 |
| 5,647,046 A * | 7/1997 | Cowen et al. | 385/136 |
| 5,758,005 A * | 5/1998 | Yoshida | 385/136 |
| 5,775,173 A * | 7/1998 | Wagner | 74/502.2 |
| 5,784,979 A * | 7/1998 | Nelson, III | 114/218 |
| 5,897,087 A * | 4/1999 | Farley | 248/229.21 |
| 6,000,890 A * | 12/1999 | Macias | 410/116 |
| 6,260,498 B1 * | 7/2001 | Cochran | 114/218 |
| 6,295,700 B1 * | 10/2001 | Plzak | 24/134 R |
| 6,505,384 B1 * | 1/2003 | Renton et al. | 24/134 R |
| 7,039,988 B2 * | 5/2006 | De France | 24/136 R |
| 7,353,910 B2 * | 4/2008 | Klingler | 182/5 |
| 8,001,686 B2 * | 8/2011 | Swindell et al. | 29/869 |
| 2008/0018062 A1 * | 1/2008 | Wachtler et al. | 279/123 |
| 2009/0026023 A1 * | 1/2009 | Petzl et al. | 188/65.4 |

FOREIGN PATENT DOCUMENTS

| | | | |
|---|---|---|---|
| JP | 05023730 A | * | 2/1993 |
| JP | 2003207704 A | * | 7/2003 |
| SU | 577598 A | * | 11/1977 |

* cited by examiner

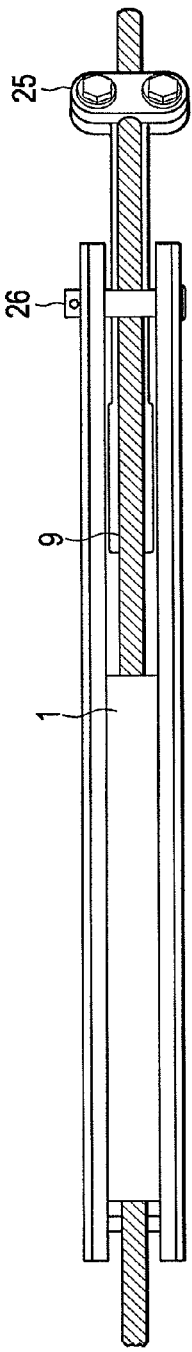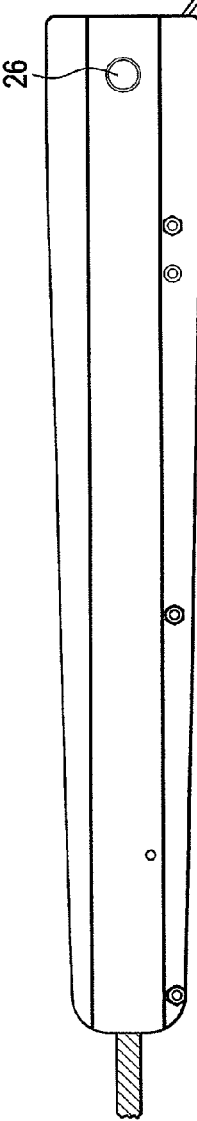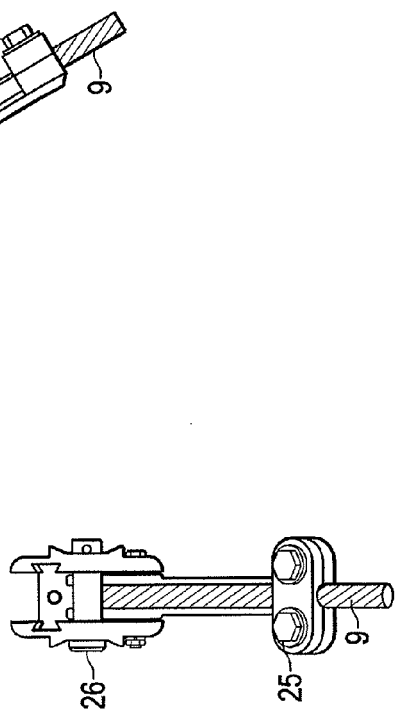

WEDGE DEADEND TO SUPPORT OPTICAL GROUND WIRE

This application claims the benefit of U.S. Provisional Application No. 61/043,185, filed Apr. 8, 2008 in the United States Patent Office, the disclosure of which is incorporated herein in its entirety by reference.

BACKGROUND OF THE INVENTION

1. Field of the Invention

This invention pertains to a wedge deadend that maintains the tension in wires and cables. More particularly, it pertains to a wedge deadend that maintains the tension in optical ground wires and cables.

2. Existing Technology

Deadends are used to attach wiring and cables, such as optical cables, to support structures. One type of deadend known in the art is the bolted deadend, illustrated in FIG. 1. These deadends consist of a body 100, top keepers 101, bolts, washers, and other attachment hardware 102, for attachment to a tower or other support structure (not shown). The number of keepers and other associated hardware is determined by the size and strength of the cable being installed. In some cases the keepers 101 must be removed from the deadend in order to install the cable. The keepers 101 and the other attachment hardware 102 are loose, and can be dropped during installation. Additionally, this deadend is heavy, with numerous bolts that must be tightened and torqued in sequence. As a result, a bolted deadend is time consuming to install.

Another known type of deadend is the formed wire deadend 200, illustrated in FIG. 2. Formed wire deadends are difficult to install. Wrapping the formed wires 201 around the cable 202 requires a great deal of hand strength. Also, the installer's fingers often get pinched while wrapping the formed wires 201 around the cable 202, which normally requires gloves to be worn during installation. Furthermore, formed wire deadends can be very long. The installer often cannot complete installation at the support structure, and must leave the site of installation in order to access the end of the deadend. As a result of this length, formed wired deadends can become excessively bulky and heavy. Furthermore, accurate alignment, which often takes a great amount of time, must be maintained between the bundles of wire.

A third type of deadend known in the art is the fiber optic clamp 300, illustrated in FIG. 3. These deadends have bolts 301 that must be tightened and torqued in sequence. This process is time consuming, and installation torque must be achieved to obtain the required holding strength.

A fourth type of deadend is the wedge deadend 400, illustrated in FIG. 4. These deadends use opposed wedges 401 and 402 positioned in a support structure 403 in order to hold a wire. As described in U.S. Pat. No. 5,647,046 ("Wedge Deadend to Support Aerial Cable"), a wedge deadend is both lighter and easier to assemble and install than the above-described alternatives.

However, existing wedge deadends are not capable of supporting Optical Ground Wire ("OPGW") cables, which have some fundamental differences over the aerial cables held by U.S. Pat. No. 5,647,046. First, OPGW cable has "Reel Set" when it comes off the cable reel. That is, the cable retains the curvature of the reel even after it is unwound. Depending on the size (diameter) and construction (i.e.: alumoweld steel strands, alloy strands, aluminum pipe, stainless fiber tubes, etc.), OPGW cable can be difficult to straighten for installation.

Secondly, if a deadend is to have a wedge device to grasp the cable, the wedge must be designed to remain in place after installation. During use, the cable will experience forces from wind, snow, thermal expansion, and so forth. These forces cause vibration, cable motion, and loading, such that the OPGW cable will exert force which may loosen the wedge. The design of the wedge must therefore be self-locking.

For a wedge to be self-locking, it must have an angle similar to a "Jarno Taper" with a very small angle. A Jarno Taper is used on drills, reamers, etc. for remaining tight while still being easily removed. The problem of having a wedge with a very small angle is the "length of travel" necessary to open the grooves sufficient to accept the cable. Limiting the deadend's length limits the wedge travel and opening. This problem, and the "reel set" mentioned above, makes the top wedge difficult to advance to its proper position on the OPGW cable for loading and tensioning. Both wedges must align in order for the deadend to be properly installed. An offset in the wedge alignment will cause a stress point and a bend location, which can damage and eventually break the cable. To ensure the final location of the wedges is aligned, it is necessary to have both wedges advance evenly and together when the cable is tensioned. Therefore, it is necessary that both wedges be able to "grab" the cable.

If the above problems of reel set and the angle of the wedges keep the wedges from being aligned, it is left to the installer to force the top wedge into the installation position, through use of fingers, screwdrivers, rods, etc. This forcing could cause damage to the cable or the installer's hands.

Furthermore, it is necessary for the wedges to create the proper "squeeze" on the cable to advance the wedges together when the cable is tensioned. Otherwise the wedges will not "grab" the cable. That is, the cable could slip and not be retained. Proper wedge pressure on the cable is therefore required to ensure proper installation.

SUMMARY OF THE INVENTION

It is an object of this invention to provide a wedge deadend suitable for use in OPGW wires and cables.

To achieve this object, this invention is directed to a wedge deadend including a frame having a pair of plates, between which are held opposed upper and lower wedges. The wedges each include a longitudinal recess on an inner face, such that when the wedges are disposed in the frame with the inner faces opposed to one another and their edges tapering towards one end of the frame, a longitudinal opening suited for seating a cable is created between the wedges.

The invention also includes a cam member disposed rotatably between the plates, and including a slot suitable for holding the cable. The wedges are aligned by the rotation of this cam member.

This cam member may preferably be disposed at the end of the frame opposite the end the wedges taper towards.

The side plates may preferably be arranged such that the lower wedge is held between them and may only slide between the ends of the frame.

The wedges must also be able to grab the cable so that they advance in unison. To accomplish this objective, serrations may be provided in the longitudinal recess of at least one of the wedges.

The rotation of the cam member may preferably move the upper wedge, while the lower wedge is preferably held substantially stationary. The lower wedge is preferably held substantially stationary by a retaining member which connects the plates. This retaining member is preferably colored black.

The retaining member is also preferably installed in a first position in the plates prior to the upper and lower wedges being aligned, and a second position in the plates after the wedges are aligned, such that in the second position, the retaining member holds the cam member substantially stationary.

The cam member also preferably includes a lever. This lever preferably includes a keeper which attaches the cable to the lever.

The wedge deadend also preferably includes a bolt for attaching the wedge deadend to a support structure.

At least one of the wedges may also preferably include a longitudinal threaded hole.

Additionally, OPGW cable includes several fibers which must be spliced together if the cable is cut and then re-joined. Therefore, the wedge deadend preferably includes a separation mechanism for removing at least one of the wedges without cutting the cable, after the wedges have been aligned. This separation mechanism preferably fits into the above-mentioned threaded hole, and may comprise a threaded rod.

The plates in the above-identified frame may also be made parallel to each other.

A method of securing optical ground wire cable in accordance with the present invention includes arranging an optical ground wire cable in a frame comprising a pair of plates and a first wedge, holding the first wedge substantially stationary, inserting a second wedge into the frame, such that the first and second wedges squeeze the cable between them, subsequently rotating a cam to align the second wedge with the first wedge, and releasing the first and second wedges such that the first and second wedges move in unison in accordance with a tension in the cable.

The advantages of the new wedge deadend include:
1. It is lightweight.
2. Installation is both quick and easy.
3. The squeeze on the cable is proportional to the pull on the cable. That is, the deadend consistently applies the proper squeeze from one installation to the next.
4. It removes the "Human Factor" in the installation. That is, it eliminates bolt torque, torquing sequence, wire wrapping, and the other problems associated with the installer.
5. It is unique to the industry in the way it installs.
6. It eliminates the task of straightening the conductor prior to installation.

BRIEF DESCRIPTION OF THE DRAWINGS

FIGS. 14(a)-(c) illustrate, respectively, top, side, and back views of the exemplary embodiment of the invention after the cable is secured.

DETAILED DESCRIPTION OF THE EXEMPLARY EMBODIMENTS

Figure 1:
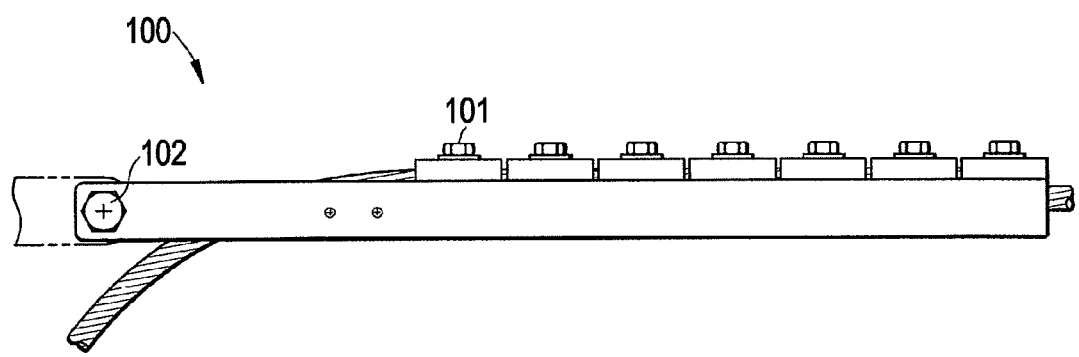
FIG. 1 illustrates a conventional bolted deadend.
Figure 2:
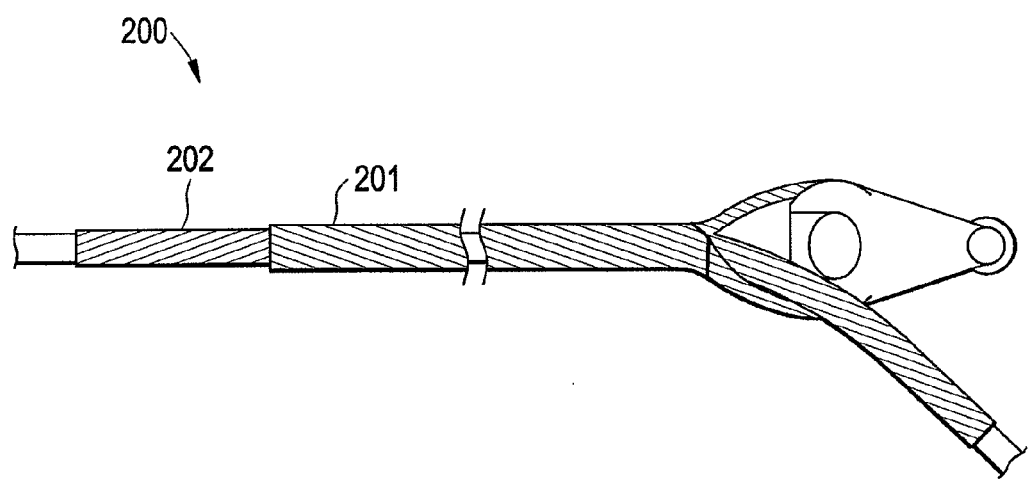
FIG. 2 illustrates a conventional formed wire deadend.
Figure 3:
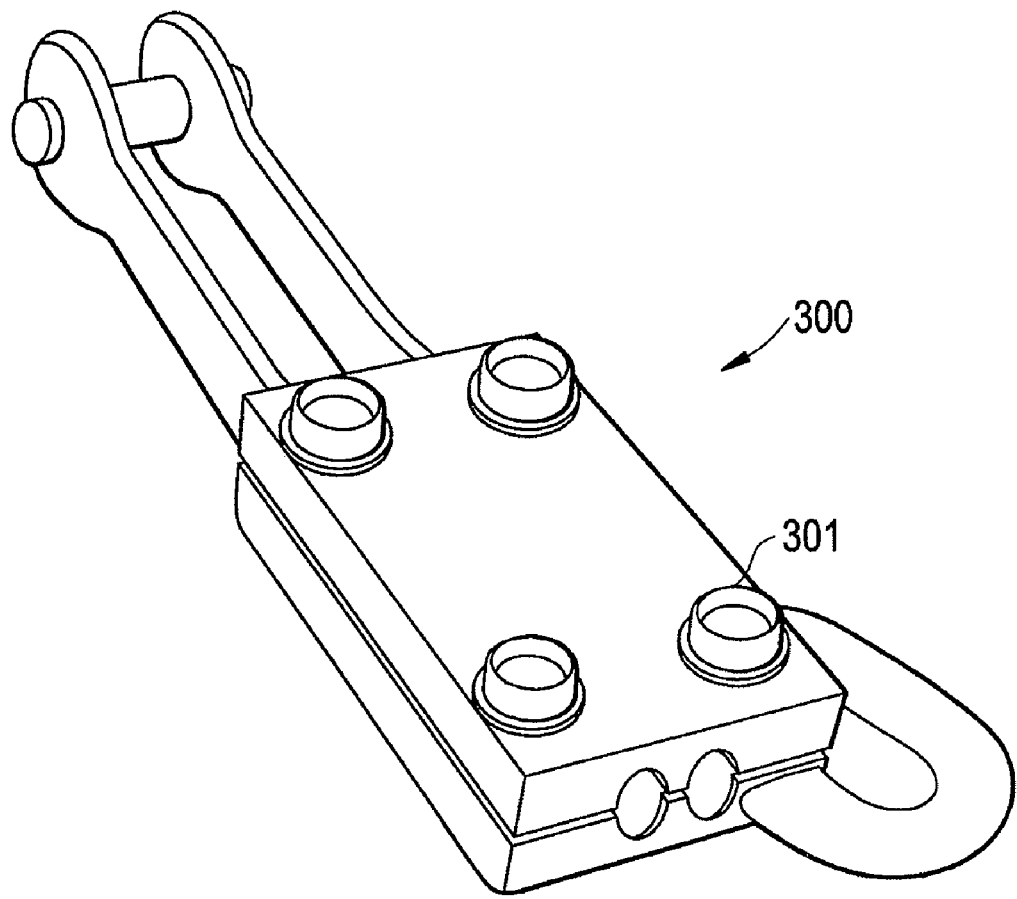
FIG. 3 illustrates a conventional fiber optic clamp.
Figure 4:
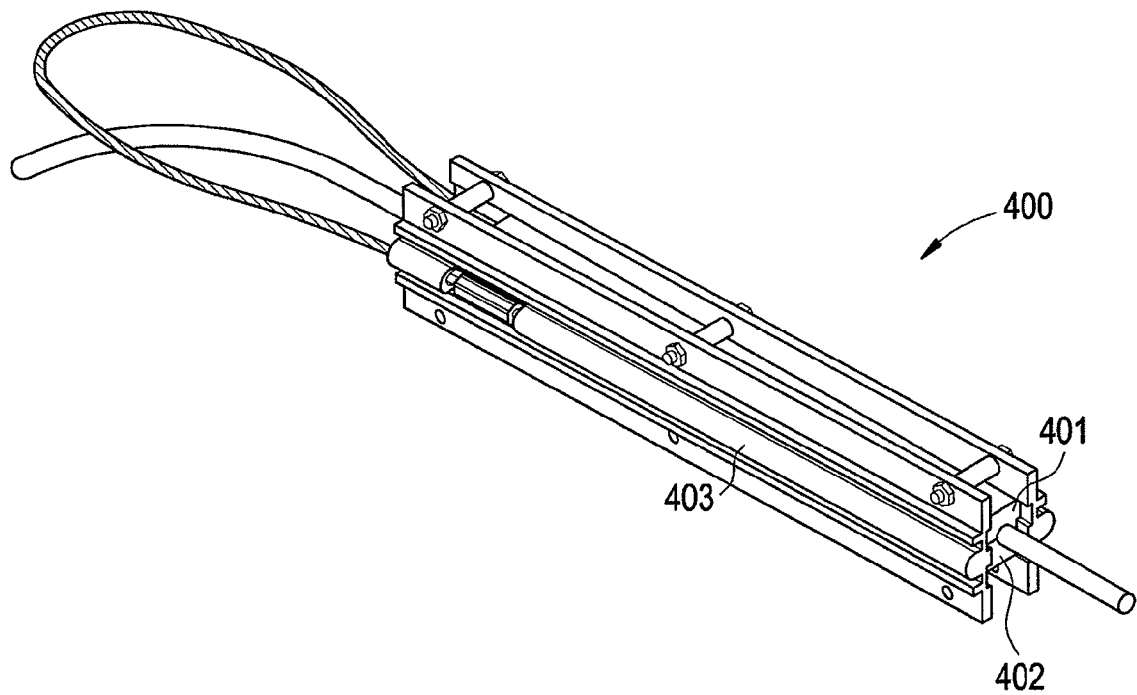
FIG. 4 illustrates a conventional wedge deadend.
Figure 5A:
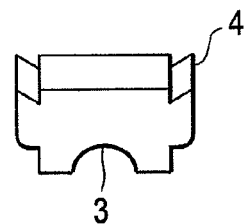
FIGS. 5(a)-5(d) illustrate, respectively, front, back, side, and bottom views of one of the wedges used in the exemplary embodiment of the invention.
Figure 5B:
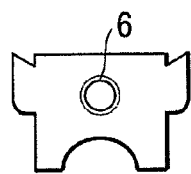
Figure 5C:
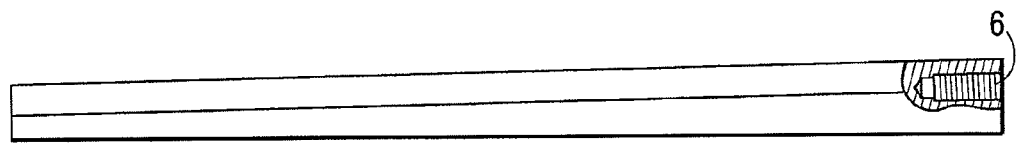
Figure 5D:
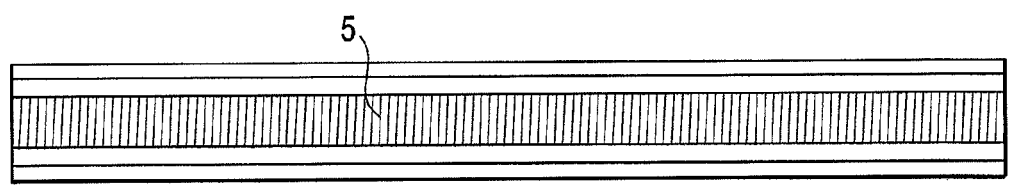

Advantages and features of the present invention and methods of accomplishing the same may be understood more readily by reference to the following detailed description of the exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

An exemplary embodiment of the wedge deadend includes an upper wedge 1 and a lower wedge 2. The upper and lower wedges are preferably shaped identically to one another. FIG. 5(a)-5(d) illustrate an exemplary embodiment of one of the wedges. Each wedge includes a recess 3 suited for holding a cable, and projections 4 extending from the sides of the wedge.

The recess 3 of each wedge also preferably includes serrations 5. These serrations allow the wedges to better grip the cable, such that after the wedges are aligned, motion of the cable or the wedges does not move the wedges out of alignment. Gripping the cable in this manner also helps to negate the effects of "reel set" in the cable, which otherwise may keep the cable from fitting into the recess 3 of the wedges. The serrations also allow the same wedges to be used with different cables, since the serrations improve grip on any cable, regardless of the cable construction.

Each wedge also preferably includes a threaded hole 6, for use with a removal tool 30, described later.

Figure 6:
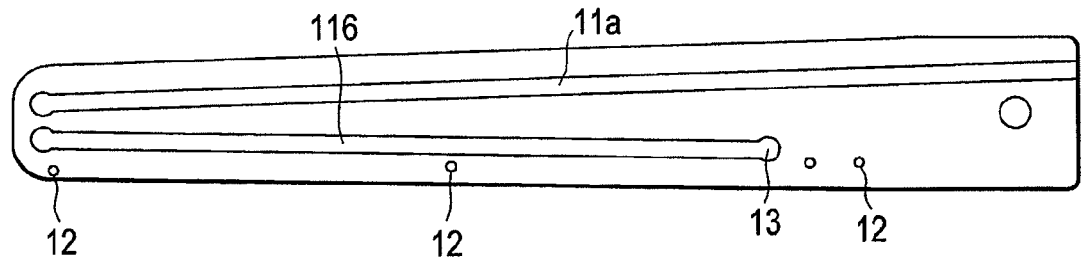
FIG. 6 illustrates one of the side plates used in the exemplary embodiment of the invention.
Figure 7:
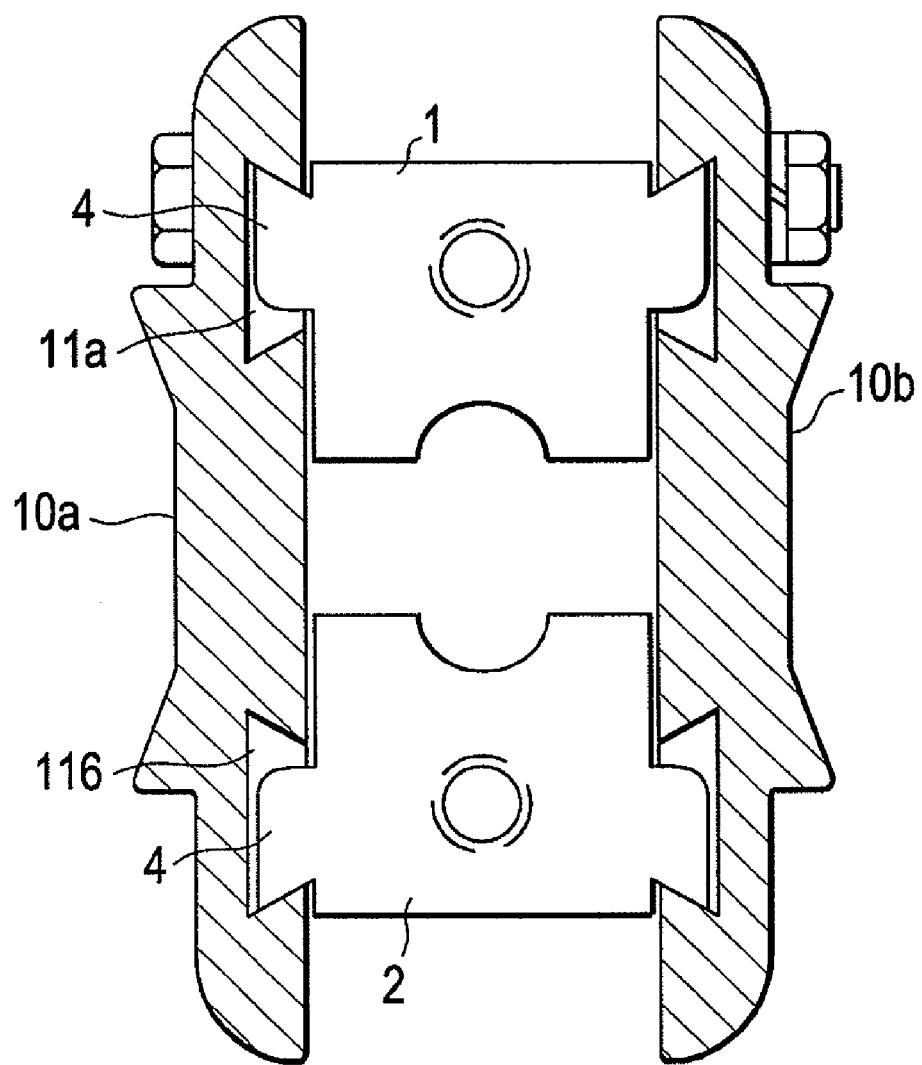
FIG. 7 is a front cross-sectional view of the exemplary embodiment of the invention prior to cable installation.

The wedge deadend consists of a pair of side plates 10a and 10b, which form a frame which holds an upper wedge 1, a lower wedge 2, and the other components. FIG. 6 illustrates an exemplary embodiment of one of the side plates use in the invention herein described. The side plates preferably each include grooves 11a and 11b, suitable for receiving projections 4 of the wedges 1 and 2, respectively, as shown in FIG. 7.

FIGS. 7-13 illustrate the assembly of an exemplary embodiment of the claimed invention. For clarification purposes, FIGS. 7-12 give breakaway views of the interior of the wedge deadend.

First, the side plates are connected by conventional means, such as by bolts inserted through holes 12. The projections 4 of lower wedge 2 are also inserted into lower grooves 11b of the side plates. As seen in FIG. 6, the lower groove 11b preferably does not extend to any edge of the side plates. In this way, the lower wedge 2 is "held" between the side plates, such that it cannot slide out of the deadend while the side plates are connected.

Figure 8:
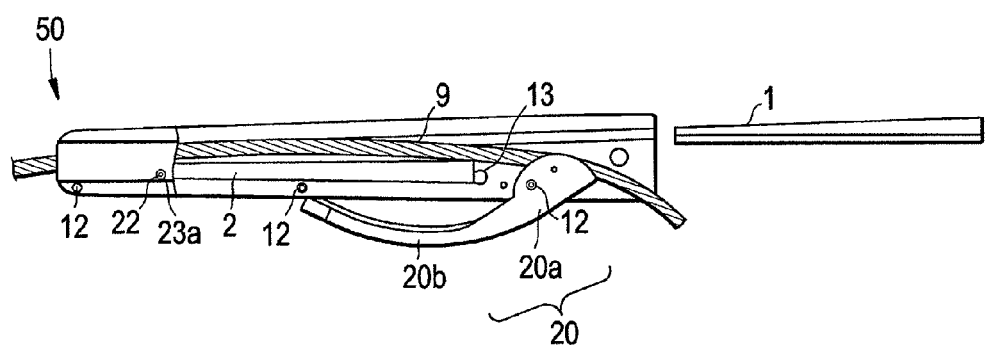
FIG. 8 is a side cross-sectional view of the exemplary embodiment of the invention before the wedges are installed.

As shown in FIG. 8, during installation, and the bottom wedge 2 is retracted back to a rear end 13 of the groove while the top wedge 1 is kept separate. A retaining bolt 22 is installed through a hole 23a at a first location in both side plates 10a and 10b, then secured by, for example, a lock washer and nut. This retaining bolt 22 is preferably a heat-treated cap screw or other high-strength bolt.

The apparatus 50 also includes a cam 20a and lever mechanism 20b as part of a cam/bail retainer 20, which simplifies and ensures proper installation of the deadend. Once the retaining bolt 22 is installed through hole 23a, the cam/bail retainer 20 is then advanced to the position shown in FIG. 8. Then a cable 9 is installed through the open top of the assembly 50 and seated in the lower wedge 2.

Figure 9:
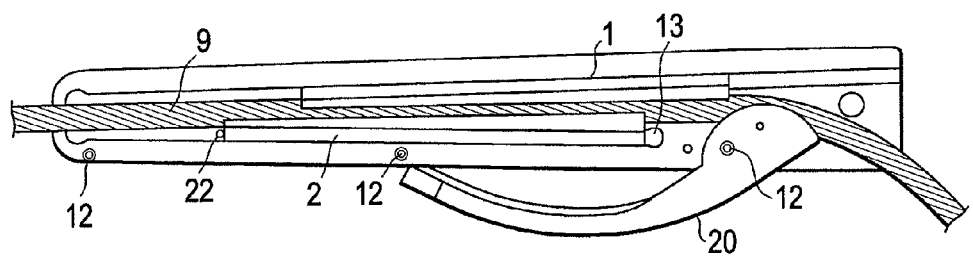
FIG. 9 is a side cross-sectional view of the exemplary embodiment of the invention after the top wedge is positioned.

Subsequently, as shown in FIG. 9, the top wedge 1 is then inserted into the assembly 50, and is pushed beyond the cam 20a of the cam/bail retainer 20. This insertion can be done by the installer with minimal difficulty, since the top and bottom wedges 1 and 2 are not yet gripping the cable 9, nor are they being aligned.

Figure 10:
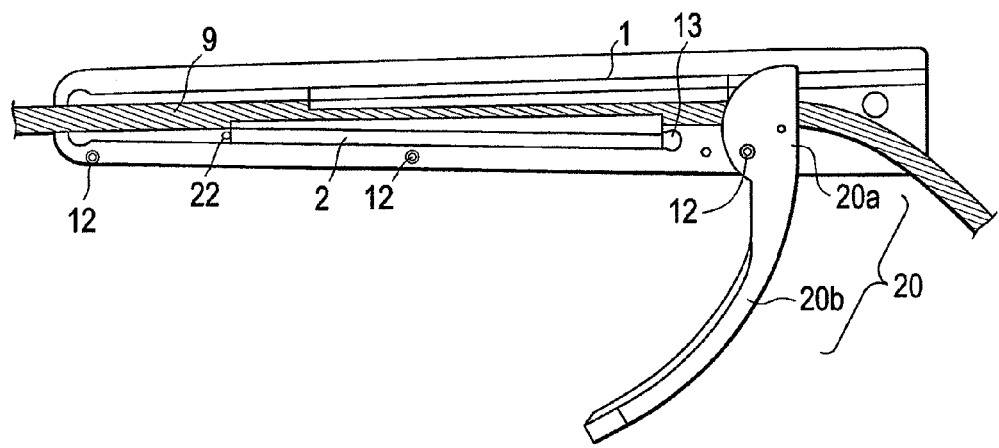
FIG. 10 is a side cross-sectional view of the exemplary embodiment of the invention during alignment of the wedges.
Figure 11:
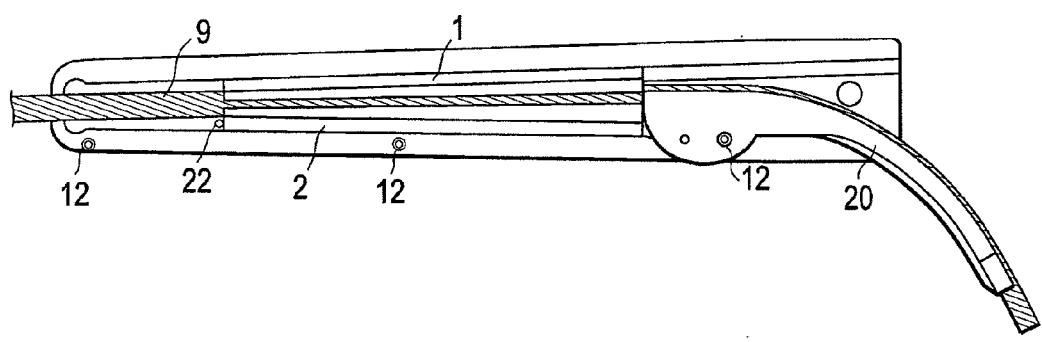
FIG. 11 is a side cross-sectional view of the exemplary embodiment of the invention after alignment of the wedges.

Next, as shown in FIG. 10, the lever 20b of the cam/bail retainer 20 is pulled back. This presses the cam 20a against the top wedge 1, advancing the top wedge 1 towards the front of the assembly 50. During this process, the retaining bolt 22 keeps the lower wedge 2 substantially stationary. Once the lever 20b is fully pulled back to the position shown in FIG. 11, the top wedge 1 will be aligned with the bottom wedge. No further input from the installer is necessary in order to align the top and bottom wedges 1 and 2.

Figure 12:
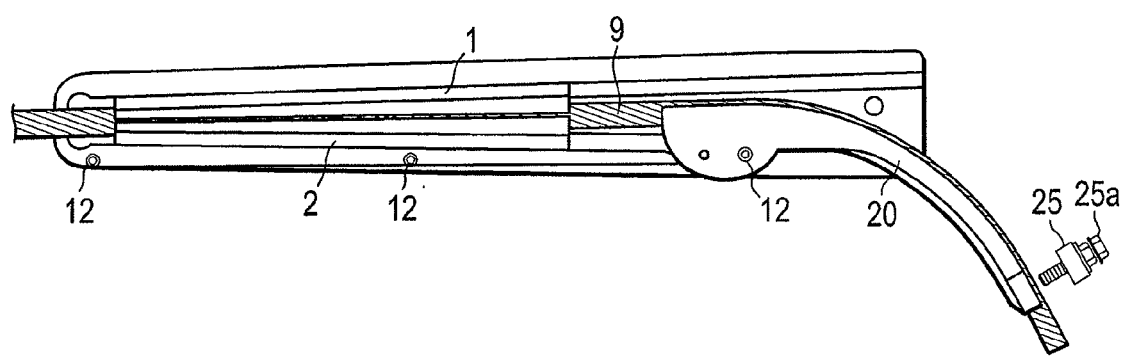
FIG. 12 is a side cross-sectional view of the exemplary embodiment of the invention while the cable is secured.
Figure 13:
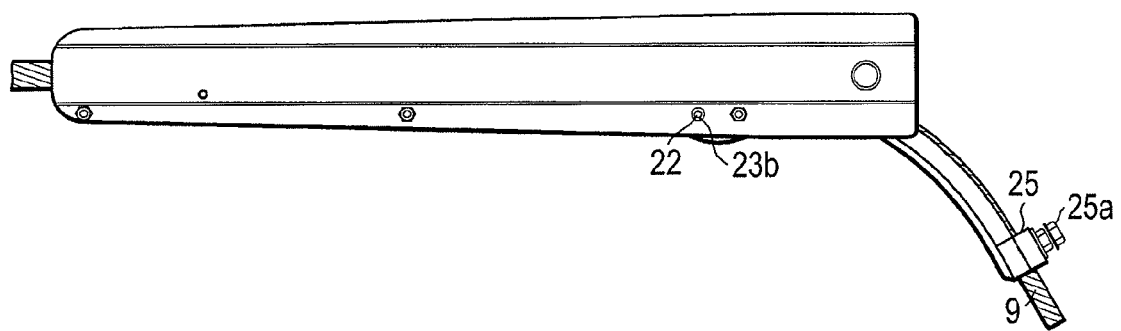
FIG. 13 is a side view of the exemplary embodiment of the invention after the cable is secured.

As shown in FIGS. 12 and 13, the retaining bolt 22 is then removed from the hole 23a at the first location and installed through hole 23b at a second location through both side plates 10a and 10b. This allows wedges 1 and 2 to advance proportionately to the tension in the cable, and locks the cam/bail retainer 20 in position. This also provides a visible indication that the assembly has been properly installed. For this reason, the retaining bolt is preferably anodized or otherwise colored black, in order to be visible. The retaining bolt 22 is then secured, for example, with a lock washer and nut.

FIGS. 14(a)-(c) show the assembled deadend. At this point, the cable 9 is securely held in the deadend, and the deadend may be attached to a tower or other support (not shown). Examples of attachment methods include a Clevis Pin or a bolt 26.

The cable 9 may have been provided with a comealong (not shown), which is a device which holds the cable and maintains the tension in the cable prior to the cable's installation in a deadend. The comealong is attached to a tensioning device (not shown), which is attached to the support structure. The comealong is located a predetermined distance from the end of the cable, leaving the end of the cable 9 free for attachment to the deadend. Once tension is released on the comealong, the top and bottom wedges 1 and 2 will advance proportionally to the pull of the cable, securely gripping the cable 9.

Finally, as illustrated in FIGS. 12 and 13, the end of the cable 9 is formed into the bail retainer 20, and a keeper 25 is attached in order to hold the cable 9 in place. The keeper 25 includes breakaway bolt heads 25a, which break off after the keeper has been sufficiently tightened. At this point, installation of the deadend is complete.

Figure 15A:
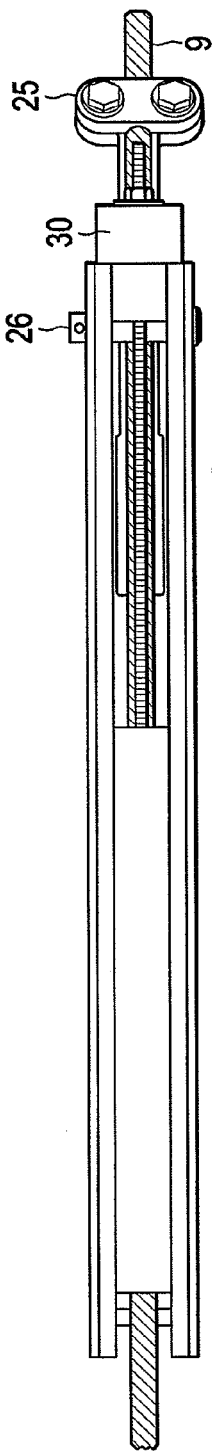
FIGS. 15(a)-15(c) illustrate, respectively, top, side, and back views of the exemplary embodiment of the invention including a removal tool.
Figure 15B:
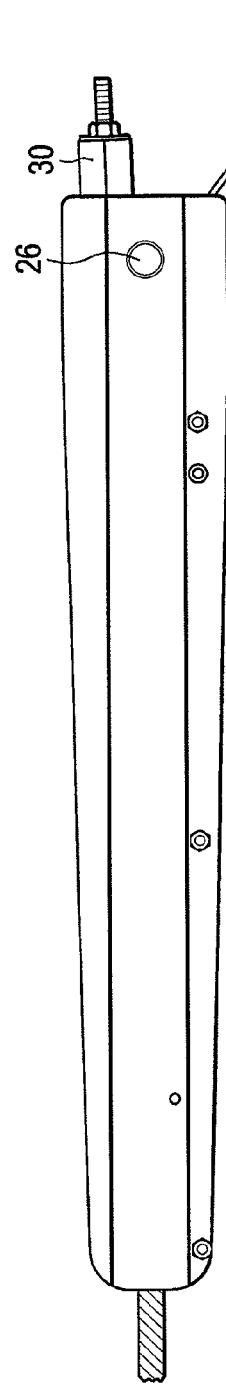
Figure 15C:
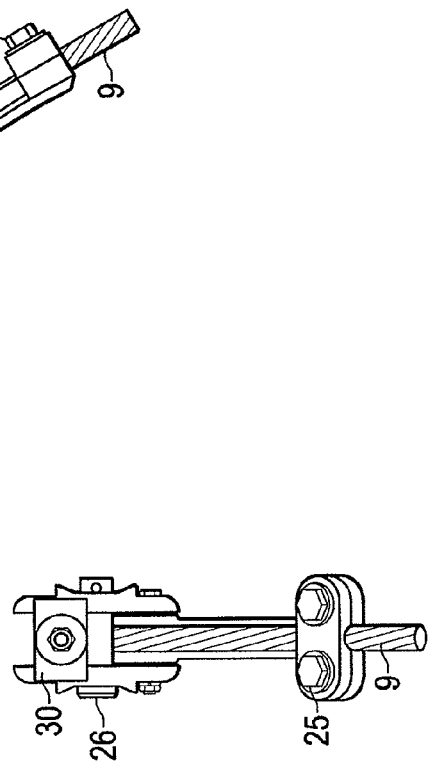
Figure 16A:
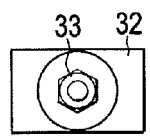
FIGS. 16(a)-16(d) illustrate, respectively, front, back, side, and bottom views of a removal tool used with the exemplary embodiment of the invention.
Figure 16B:
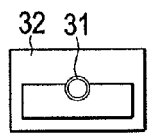
Figure 16C:
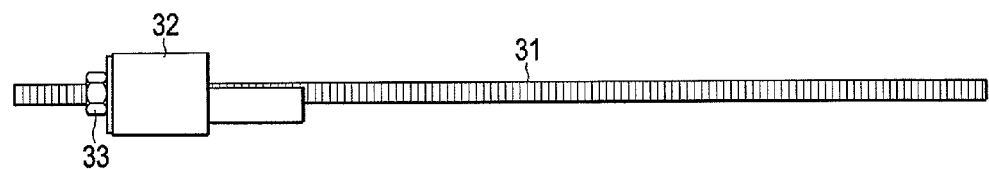
Figure 16D:
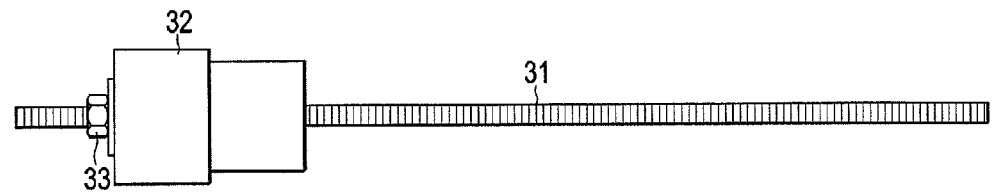

The deadend also preferably include a means for separating the wedges without cutting the cable. As illustrated in the breakaway view in FIG. 5(c), each wedge includes a threaded hole 6, which allows the wedges to be separated with a tool 30 as shown in FIGS. 15(a)-(c). The tool 30 is illustrated in FIGS. 16(a)-(d), and includes a threaded rod 31, block 32, and nut/washer assembly 33. To separate the wedges, the threaded rod 31 is inserted into a threaded hole 6 in the top wedge until the block 32 abuts against the wedge, as seen in FIG. 15. Then, by turning the nut/washer assembly 33 about the threaded rod 31, the installer may pull the top wedge back until the cable is released.

Although both wedges 1 and 2 are shown with threaded holes 6 in this exemplary embodiment, only the top wedge 1 must be formed with a threaded hole 6.

Although exemplary embodiments of the present invention have been described for illustrative purposes, those skilled in the art will appreciate that various modifications, additions and substitutions are possible, without departing from the scope and spirit of the invention as disclosed in the accompanying claims. The foregoing embodiments are merely exemplary and are not to be construed as limiting the present invention. Therefore, the scope of the present invention should be defined by the accompanying claims and their legal equivalents

The invention claimed is:

1. A securing apparatus comprising:
   a frame having a pair of plates with each plate having an inwardly facing surface and an outwardly facing surface such that the inwardly facing surfaces of the plates are facing each other, the frame having a first and a second end;
   opposed upper and lower wedges having longitudinal tapered edges, the wedges each having an inner face with a longitudinal recess such that when the wedges are disposed in said frame with the inner faces opposed to one another, a longitudinal opening suited for seating a cable is created by the longitudinal recesses,
   wherein the inner faces of the wedges are substantially perpendicular to the inwardly facing surfaces of the frame;
   a cam having a slot suitable for holding the cable, said cam being disposed rotatably between the plates,
   wherein the inwardly facing surface of each plate is arranged to receive the edges of the wedges such that the wedges may be slidably mounted in the frame with the inner faces opposed to one another, and the edges of the wedges both tapering towards the first end of the frame,
   wherein by the rotation of the cam, the cam presses against the upper wedge, advancing the upper wedge towards the first end in a longitudinal direction of the cable.

2. The apparatus of claim 1, wherein the cam is disposed at the second end of the frame.

3. The apparatus of claim 1, wherein the inwardly facing surfaces of the plates are arranged such that the lower wedge may only slide between the first and second ends of the frame.

4. The apparatus of claim 1, further comprising a plurality of serrations disposed substantially transversely across the longitudinal recess of at least one of the upper and lower wedges.

5. The apparatus of claim 4, wherein both the upper and lower wedges include a plurality of serrations disposed substantially transversely across their longitudinal recesses.

6. The apparatus of claim 1, wherein the lower wedge is held substantially stationary during rotation of the cam.

7. The apparatus of claim 6, further comprising a retaining member which connects the plates,
   wherein the retaining member holds the lower wedge substantially stationary during rotation of the cam.

8. The apparatus of claim 7, wherein the retaining member is colored black.

9. The apparatus of claim 7, wherein the retaining member is installed in a first position in the plates prior to the upper and lower wedges being aligned, and is installed in a second position in the plates after the upper and lower wedges are aligned.

10. The apparatus of claim 9, wherein when the retaining member is installed in the second position in the plates, the retaining member holds the cam substantially stationary.

11. The apparatus of claim 1, further comprising a lever to rotate the cam.

12. The apparatus of claim 11, further comprising a keeper which attaches the cable to the lever.

13. The apparatus of claim 1, further comprising a bolt for attaching the apparatus to a support structure.

14. The apparatus of claim 1, further comprising a longitudinal threaded hole in at least one of the wedges.

15. The apparatus of claim 14, further comprising a separation device which fits into the threaded hole, such that a force exerted on the separation device in the direction of the second end of the frame removes at least one of the wedges from the frame.

16. The apparatus of claim 15, wherein the separation device comprises a threaded rod.

17. The apparatus of claim 1, wherein said plates are parallel to each other.

18. A method for securing a cable comprising:
arranging cable in a frame comprising a pair of plates and a first wedge substantially perpendicular to the plates; holding the first wedge substantially stationary; inserting second wedge into the frame, such that the first and second wedges squeeze the cable between them; subsequently rotating a cam to press again the second wedge advancing the second wedge towards a first end and align the second wedge with the first wedge; and releasing the first and second wedges such that the first and second wedges move in unison in accordance with a tension in the cable.

19. The apparatus of claim 1, wherein the rotation of the cam aligns the upper and lower wedges.

20. The apparatus of claim 1, the slot extends an entire length of the cam.

21. The apparatus of claim 11, the slot extends an entire length of the lever.

* * * * *